(12) United States Patent
Stroebel

(10) Patent No.: US 11,851,102 B2
(45) Date of Patent: Dec. 26, 2023

(54) REVERSE DRIVING ASSISTANCE SYSTEM

(71) Applicant: Bayerische Motoren Werke Aktiengesellschaft, Munich (DE)

(72) Inventor: Michael Stroebel, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 699 days.

(21) Appl. No.: 17/045,684

(22) PCT Filed: Apr. 15, 2019

(86) PCT No.: PCT/EP2019/059707
§ 371 (c)(1),
(2) Date: Oct. 6, 2020

(87) PCT Pub. No.: WO2019/201875
PCT Pub. Date: Oct. 24, 2019

(65) Prior Publication Data
US 2021/0024129 A1 Jan. 28, 2021

(30) Foreign Application Priority Data
Apr. 20, 2018 (DE) .................... 10 2018 206 121.1

(51) Int. Cl.
*B62D 15/02* (2006.01)
*B60K 35/00* (2006.01)
*G01B 11/27* (2006.01)

(52) U.S. Cl.
CPC .......... *B62D 15/028* (2013.01); *B60K 35/00* (2013.01); *B60K 2370/152* (2019.05); *B60K 2370/173* (2019.05); *G01B 11/272* (2013.01)

(58) Field of Classification Search
CPC ............ G01B 11/272; B60K 2370/152; B60K 2370/173; B60K 35/00; B62D 15/028
(Continued)

(56) References Cited

U.S. PATENT DOCUMENTS

| 10,279,839 | B2 * | 5/2019 | Lavoie | B62D 13/06 |
| 10,752,289 | B2 * | 8/2020 | Stroebel | B60W 30/00 |

(Continued)

FOREIGN PATENT DOCUMENTS

| CN | 101332836 A | 12/2008 |
| CN | 103958313 A | 7/2014 |

(Continued)

OTHER PUBLICATIONS

International Search Report (PCT/ISA/210) issued in PCT Application No. PCT/EP2019/059707 dated Aug. 5, 2019 with English translation (six pages).

(Continued)

*Primary Examiner* — Yazan A Soofi
(74) *Attorney, Agent, or Firm* — Crowell & Moring LLP

(57) ABSTRACT

A reverse driving assistance system assists a driver in steering a towing vehicle having a trailer. The system has an operating element for specifying a target articulation angle, a sensor device for detecting the current articulation angle of the vehicle-trailer combination, a display unit at least for displaying the specified target articulation angle, and an electronic control unit connected to the aforementioned components. The control unit also has an evaluation unit for recognizing an implausible specification of the target articulation angle and a protection unit for restricting the reverse driving assistance functionality if an implausible target specification is recognized. An implausible specification of the target articulation angle can be recognized at least by detecting the frequency of the change in direction of the operating element within a predetermined time and by comparing the detected value with a defined threshold value. The reverse driving assistance functionality is restricted if an implausible target specification is detected as a result of this threshold value being exceeded.

10 Claims, 1 Drawing Sheet

(58) Field of Classification Search
USPC .......................................................... 701/42
See application file for complete search history.

(56) References Cited

U.S. PATENT DOCUMENTS

| | | | |
|---|---|---|---|
| 2009/0005932 A1* | 1/2009 | Lee | G01S 13/862 |
| | | | 701/41 |
| 2014/0222288 A1* | 8/2014 | Lavoie | G06F 17/00 |
| | | | 701/99 |
| 2014/0303847 A1* | 10/2014 | Lavoie | B62D 15/0275 |
| | | | 701/41 |
| 2015/0149040 A1* | 5/2015 | Hueger | B62D 15/0275 |
| | | | 701/41 |
| 2015/0367844 A1* | 12/2015 | Tagesson | B60W 10/20 |
| | | | 701/41 |
| 2015/0367886 A1* | 12/2015 | Lavoie | B62D 13/06 |
| | | | 701/41 |
| 2016/0229453 A1* | 8/2016 | Yang | B60D 1/322 |
| 2016/0264046 A1* | 9/2016 | Bochenek | B60T 8/248 |
| 2017/0267283 A1* | 9/2017 | Wagner | B62D 6/002 |
| 2017/0297619 A1* | 10/2017 | Lavoie | B62D 15/024 |
| 2019/0375454 A1* | 12/2019 | Kasaiezadeh Mahabadi | |
| | | | B62D 13/00 |

FOREIGN PATENT DOCUMENTS

| | | |
|---|---|---|
| CN | 103963781 A | 8/2014 |
| CN | 105829178 A | 8/2016 |
| CN | 107200063 A | 9/2017 |
| DE | 10 2014 202 615 A1 | 8/2015 |
| DE | 10 2017 209 980 A1 | 12/2018 |
| DE | 10 2017 222 538 A1 | 6/2019 |

OTHER PUBLICATIONS

German-language Written Opinion (PCT/ISA/237) issued in PCT Application No. PCT/EP2019/059707 dated Aug. 5, 2019 (six pages).

German-language Search Report issued in German Application No. 10 2018 206 121.1 dated Jan. 25, 2019 with partial English translation (12 pages).

Chinese-language Office Action issued in Chinese Application No. 201980026852.9 dated Mar. 3, 2022 with English translation (14 pages).

* cited by examiner

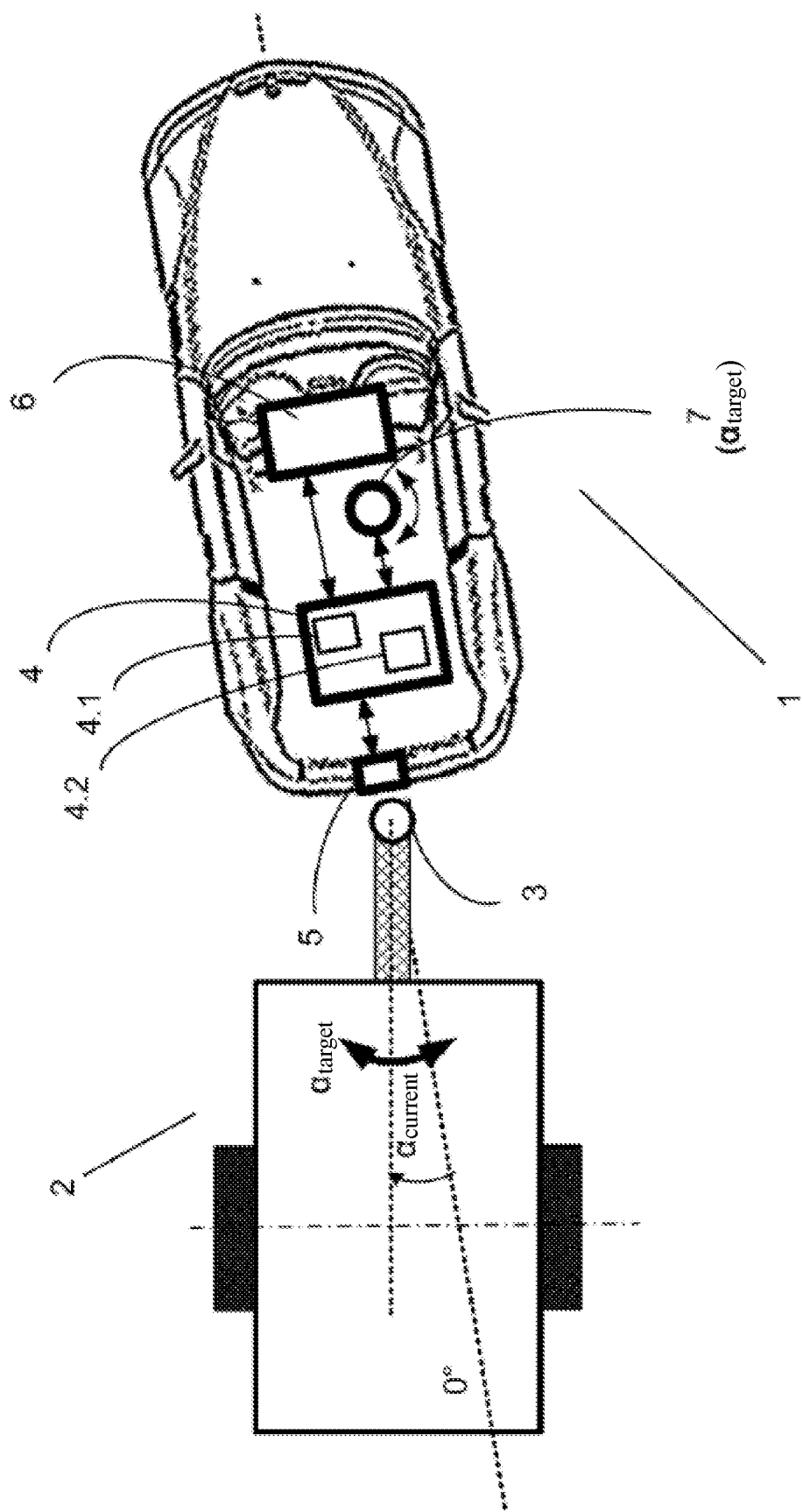

REVERSE DRIVING ASSISTANCE SYSTEM

BACKGROUND AND SUMMARY OF THE INVENTION

The invention relates to a reverse driving assistance system in the form of a driver-assisting control system for steering a towing vehicle with a trailer, which reverse driving assistance system comprises an operator control element for specifying an articulation angle and an electronic control unit which is connected to the operator control element.

Reverse driving with a trailer which is moved by a towing vehicle via a trailer hitch requires some practice since the trailer inclines to "veer out". Therefore, a large number of reverse driving assistance systems for vehicles with trailers are already known.

For example, the Applicant is already aware internally of the German patent application DE 10 2017 209 980, unpublished at the priority date of the present application, which discloses a reverse driving assistance system for steering a vehicle combination (=towing vehicle with trailer) with at least one electronic control unit, with a sensor device for sensing the articulation angle of the vehicle combination (=angle between the longitudinal axis of the towing vehicle and the longitudinal axis of the trailer), with an operator control unit for specifying a target articulation angle, and with a display unit. In this reverse driving assistance system, the control unit comprises a function unit which determines a maximum permissible articulation angle, and which displays a setting of an articulation angle which goes beyond the maximum permissible articulation angle as critical in terms of a collision, prevents it or permits it, only after a specified delay.

The present invention is based on this above-mentioned prior art and has the object of improving further a driver assistance system for a vehicle combination in respect of its operational control safety and functional quality.

The reverse driving assistance system according to the invention for assisting the driver in steering a towing vehicle with a trailer has an operator control element for specifying a target articulation angle, a sensor device for sensing the current articulation angle of the vehicle combination, a display unit at least for displaying the set target articulation angle, and an electronic control unit which is connected to the above-mentioned components. The control unit also comprises an evaluation unit for detecting an implausible specification of the target articulation angle and a protection unit for restricting the reverse driving assistance functionality if an implausible target specification is detected.

In particular, an implausible specification of the target articulation angle can be detected at least by sensing the frequency of the change of direction of the operator control element within a specified time and by comparing the sensed value with a defined threshold value. The reverse driving assistance functionality is restricted if an implausible target specification is detected as a result of this threshold value being exceeded.

The invention is based on the following realizations.

In a trailer assistance system function, the target articulation angle of the trailer which is to be maneuvered is basically specified by the driver by means of an operator control action. The system compares the target articulation angle with the actual articulation angle and adjusts the latter by means of the movement of the vehicle in an at least partially automated fashion.

By virtue of the specification of the target articulation angle, for example by means of an operator control element in the form of a rotary actuator (e.g. by means of the i-Drive actuator in current vehicles of the Applicant), the driver is able to execute rapid and frequent steering and rapid changes of direction by means of the system. As a result, the steering components of the front axle and/or rear axle are subjected to unnecessarily high loading. This can lead, inter alia, into a situation in which the steering is thermally degraded.

If "erratic steering" (=rapid steering with frequent changes of direction) is detected, wherein the detection values can preferably be parameterized, in order to protect the system, the reverse driving assistance functionality is restricted by, for example, damping the steering behavior and/or the display of the target angle over time. If the damping is not sufficient, the reverse driving assistance functionality can be restricted as far as aborting of the entire reverse driving assistance system.

The actual temperature or a temperature model of the components of the front axle steering and/or rear axle steering can preferably be taken into account as a further parameter, in order to adapt the threshold values for the detection of an implausible specification. The term "erratic steering" relates to the specification ("play") of the driver at the operator control device, e.g. the i-Drive actuator.

The invention makes possible a steady functional behavior by avoiding erratic steering in different directions. Furthermore, temperature-induced degradation and unnecessary loading of the components can be counteracted, which increases the system availability.

BRIEF DESCRIPTION OF THE DRAWING

The single FIGURE illustrates an exemplary embodiment of the invention, wherein the significant necessary components of the control system are shown.

DETAILED DESCRIPTION OF THE DRAWINGS

The single FIGURE illustrates a vehicle combination composed of a towing vehicle 1 and a trailer 2 which is connected thereto via a hitch 3. The towing vehicle 1 has an operator control element 7, as a reverse driving assistance system, for specifying a target articulation angle $\alpha_{target}$, a sensor device 5 for sensing the current articulation angle $\alpha_{current}$ of the combination, a display unit 6 at least for displaying the set target articulation angle $\alpha_{target}$ and an electronic control unit 4 which is connected to the above-mentioned components 5, 6 and 7. The first sensor device 5 can be a camera which is mounted on the rear of the towing vehicle 1. The control unit also comprises an evaluation unit 4.1 for detecting an implausible specification of the target articulation angle $\alpha_{target}$ as well as a protection unit 4.2 for restricting the reverse driving assistance functionality if an implausible target specification is detected.

By corresponding programming of the control unit 4 or of the evaluation unit 4.1 and the protection unit 4.2, at least the following advantageous function can be carried out:

An implausible specification of the target articulation angle $\alpha_{target}$ is detected at least by sensing the frequency of the change of direction of the operator control element 7 within a specified time and by comparing the sensed value with a defined threshold value. The threshold value can be capable of being specified in a variable fashion depending on a steering system component temperature. If an implausible target specification is detected as a result of the threshold value being exceeded, the reverse driving assistance functionality is restricted by taking, for example, at least one of the following measures:

(1) the display 6 of the set target articulation angle $\alpha_{target}$ is damped over time, and/or
(2) a lag time or reduction in speed of an active steering assistance process and/or
(3) the entire reverse driving assistance system is switched off.

The invention relates to a reverse driving assistance system in the form of a driver-assisting control system for steering a towing vehicle with a trailer, which reverse driving assistance system comprises an operator control element for specifying an articulation angle and an electronic control unit which is connected to the operator control element.

Reverse driving with a trailer which is moved by a towing vehicle via a trailer hitch requires some practice since the trailer inclines to "veer out". Therefore, a large number of reverse driving assistance systems for vehicles with trailers are already known.

For example, the applicant is already aware internally of the German patent application DE 10 2017 209 980, unpublished at the priority date of the present application, a reverse driving assistance system for steering a vehicle combination (=towing vehicle with trailer) with at least one electronic control unit, with a sensor device for sensing the articulation angle of the vehicle combination (=angle between the longitudinal axis of the towing vehicle and the longitudinal axis of the trailer), with an operator control unit for specifying a target articulation angle and with a display unit, in which reverse driving assistance system the control unit comprises a function unit which determines a maximum permissible articulation angle and which displays a setting of an articulation angle which goes beyond the maximum permissible articulation angle as critical in terms of a collision, prevents it or permits it only after a specified delay.

The present invention is based on this abovementioned prior art and has the object of improving further a driver assistance system for a vehicle combination in respect of its operational control safety and functional quality.

This object is achieved by means of the features of patent claim 1. The dependent claims are advantageous developments of the invention.

The reverse driving assistance system according to the invention for assisting the driver in steering a towing vehicle with a trailer has an operator control element for specifying a target articulation angle, a sensor device for sensing the current articulation angle of the vehicle combination, a display unit at least for displaying the set target articulation angle and an electronic control unit which is connected to the abovementioned components. The control unit also comprises an evaluation unit for detecting an implausible specification of the target articulation angle and a protection unit for restricting the reverse driving assistance functionality if an implausible target specification is detected.

In particular, an implausible specification of the target articulation angle can be detected at least by sensing the frequency of the change of direction of the operator control element within a specified time and by comparing the sensed value with a defined threshold value. The reverse driving assistance functionality is restricted if an implausible target specification is detected as a result of this threshold value being exceeded.

The invention is based on the following realizations:

In a trailer assistance system function, the target articulation angle of the trailer which is to be maneuvered is basically specified by the driver by means of an operator control action. The system compares the target articulation angle with the actual articulation angle and adjusts the latter by means of the movement of the vehicle in an at least partially automated fashion.

By virtue of the specification of the target articulation angle, for example by means of an operator control element in the form of a rotary actuator (e.g. by means of the i-Drive actuator in current vehicles by the applicant) the driver is able to execute rapid and frequent steering and rapid changes of direction by means of the system. As a result, the steering components of the front axle and/or rear axle are subjected to unnecessarily high loading. This can lead, inter alia, into a situation in which the steering is thermally degraded.

If "erratic steering" (=rapid steering with frequent changes of direction) is detected, wherein the detection values can preferably be parameterized, in order to protect the system the reverse driving assistance functionality is restricted by, for example, damping the steering behavior and/or the display of the target angle over time. If the damping is not sufficient, the reverse driving assistance functionality can be restricted as far as aborting of the entire reverse driving assistance system.

The actual temperature or a temperature model of the components of the front axle steering and/or rear axle steering can preferably be taken into account as a further parameter, in order to adapt the threshold values for the detection of an implausible specification. The term "erratic steering" relates to the specification ("play") of the driver at the operator control device, e.g. the i-Drive actuator.

The invention makes possible a steady functional behavior by avoiding erratic steering in different directions. Furthermore, temperature-induced degradation and unnecessary loading of the components can be counteracted, which increases the system availability.

An exemplary embodiment of the invention is illustrated in the drawing. The drawing also shows the significant necessary components of the control system according to the invention.

The single FIGURE illustrates a vehicle combination composed of a towing vehicle 1 and a trailer 2 which is connected thereto via a hitch 3. The towing vehicle 1 has an operator control element 7, as a reverse driving assistance system, for specifying a target articulation angle $\alpha_{soll}$, a sensor device 5 for sensing the current articulation angle $\alpha_{ist}$ of the combination, a display unit 6 at least for displaying the set target articulation angle $\alpha_{soll}$ and an electronic control unit 4 which is connected to the abovementioned components 5, 6 and 7. The first sensor device 5 can be a camera which is mounted on the rear of the towing vehicle 1. The control unit also comprises an evaluation unit 4.1 for detecting an implausible specification of the target articulation angle $\alpha_{soll}$ as well as a protection unit 4.2 for restricting the reverse driving assistance functionality if an implausible target specification is detected.

By corresponding programming of the control unit 4 or of the evaluation unit 4.1 and the protection unit 4.2, at least the following advantageous function can be carried out:
An implausible specification of the target articulation angle $\alpha_{soll}$ is detected at least by sensing the frequency of the change of direction of the operator control element 7 within a specified time and by comparing the sensed value with a defined threshold value. The threshold value can be capable of being specified in a variable fashion depending on a steering system component temperature. If an implausible target specification is detected as a result of the threshold value being exceeded, the reverse driving assistance functionality is restricted by taking, for example, at least one of the following measures: the display 6 of the set target articulation angle $\alpha_{soll}$ is damped over time, and/or a lag time or reduction in speed of an active steering assistance process and/or the entire reverse driving assistance system is switched off.

What is claimed is:

1. A reverse driving assistance system for assisting a driver in steering a vehicle combination of a towing vehicle having a trailer, comprising:
   an operator control element for specifying a target articulation angle;
   a sensor for sensing a current articulation angle of the vehicle combination;
   a display unit for displaying the specified target articulation angle; and
   an electronic control unit which is operatively coupled to the operator control element, the sensor, and the display, wherein the control unit comprises:
   (a) an evaluation unit for detecting an implausible specification of the target articulation angle, and
   (b) a protection unit for restricting functionality of the reverse driving assistance system when an implausible specification of the target articulation angle is detected, wherein
   the control unit is configured such that an implausible specification of the target articulation angle is detectable at least by sensing a frequency of a change of direction of the operator control element within a specified time and by comparing the sensed value with a defined threshold value, and
   the reverse driving assistance functionality is restricted when an implausible specification of the target articulation angle is detected as a result of the threshold value being exceeded.

2. The system according to claim 1, wherein damping of the display of the specified target articulation angle over time is defined as a restriction of the reverse driving assistance functionality.

3. The system according to claim 1, wherein a lag time or reduction in speed of an active steering assistance process is defined as a restriction of the reverse driving assistance functionality.

4. The system according to claim 1, wherein switching off of the reverse driving assistance system is defined as a restriction of the reverse driving assistance functionality.

5. The system according to claim 1, wherein the threshold value is defined as a function of a defined system component temperature.

6. A method of controlling a reverse driving assistance system for assisting a driver in steering a vehicle combination of a towing vehicle having a trailer, the method comprising:
   receiving, via an operator control element, a specified target articulation angle;
   sensing, via a sensor, a current articulation angle of the vehicle combination;
   displaying, via a display, the specified target articulation angle;
   detecting, via a control unit, an implausible specification of the target articulation angle; and
   restricting, via the control unit, a functionality of the reverse driving assistance system when an implausible target specification is detected, wherein
   the control unit is configured such that an implausible specification of the target articulation angle is detectable at least by sensing a frequency of a change of direction of the operator control element within a specified time and by comparing the sensed value with a defined threshold value, and
   the reverse driving assistance functionality is restricted when an implausible specification of the target articulation angle is detected as a result of the threshold value being exceeded.

7. The method according to claim 6, wherein damping of the display of the specified target articulation angle over time is defined as a restriction of the reverse driving assistance functionality.

8. The method according to claim 6, wherein a lag time or reduction in speed of an active steering assistance process is defined as a restriction of the reverse driving assistance functionality.

9. The method according to claim 6, wherein switching off of the reverse driving assistance system is defined as a restriction of the reverse driving assistance functionality.

10. The method according to claim 6, wherein the threshold value is defined as a function of a defined system component temperature.

* * * * *